United States Patent
Wang et al.

(10) Patent No.: US 11,685,326 B2
(45) Date of Patent: Jun. 27, 2023

(54) VEHICLE MASS MEASUREMENT FOR AUTOMATED BRAKING

(71) Applicant: International Business Machines Corporation, Armonk, NY (US)

(72) Inventors: Yu Ying Y Y Wang, Xi'an (CN); Ye Wang, Xian (CN); Yong Wang, Xi'an (CN); Deng Xin Luo, Xian (CN); Xiang Yu Yang, Xi'an (CN); Zhong Fang Yuan, Xi'an (CN); Wen Wang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 21 days.

(21) Appl. No.: 17/534,624

(22) Filed: Nov. 24, 2021

(65) Prior Publication Data
US 2023/0158982 A1 May 25, 2023

(51) Int. Cl.
*B60R 21/0132* (2006.01)
*B60T 7/22* (2006.01)
(Continued)

(52) U.S. Cl.
CPC .... *B60R 21/01336* (2014.12); *B60R 21/0134* (2013.01); *B60T 7/22* (2013.01); *B60R 2021/01211* (2013.01); *B60T 2250/02* (2013.01)

(58) Field of Classification Search
CPC .......... B60R 21/01336; B60R 21/0134; B60R 2021/01211; B60T 7/22; B60T 2250/02
See application file for complete search history.

(56) References Cited

U.S. PATENT DOCUMENTS

| 2010/0057361 | A1* | 3/2010 | Caveney ............... B60W 30/08 |
|---|---|---|---|
| | | | 701/469 |
| 2012/0049617 | A1* | 3/2012 | Furuyama ............. B60T 13/662 |
| | | | 303/9.75 |

(Continued)

FOREIGN PATENT DOCUMENTS

| CN | 104182379 A | 12/2014 |
|---|---|---|
| CN | 104281770 A | 1/2015 |
| CN | 106708783 A | 5/2017 |

OTHER PUBLICATIONS

Lian, Y., Zhao, Y., Hu, L., &Tian, Y. (2015). Longitudinal collision avoidance control of electric vehicles based on a new safety distance model and constrained-regenerative-braking-strength-continuity braking force distribution strategy. IEEE Transactions on Vehicular Technology, 65(6), 4079-4094. (Year: 2015).*

(Continued)

*Primary Examiner* — Ig T An
*Assistant Examiner* — Stephanie T Su
(74) *Attorney, Agent, or Firm* — Garg Law Firm, PLLC; Rakesh Garg; Michael O'Keefe

(57) ABSTRACT

From a set of point data, a set of scattered rays is constructed. From the set of scattered rays, a set of ray slopes is computed. The set of ray slopes is mapped to a corresponding set of trigonometric functions. Using an optimization method, a parameter of the set of trigonometric functions is selected. Using an inverse of the set trigonometric functions, a vehicle mass corresponding to the set of point data is computed. Based on the vehicle mass, a threshold braking distance of a collision avoidance system (Continued)

of the vehicle is adjusted, the threshold braking distance comprising a distance from an object predicted to collide with the vehicle. By braking the vehicle at least the threshold braking distance from the object, a predicted collision between the vehicle and the object is avoided.

20 Claims, 10 Drawing Sheets

(51) Int. Cl.
  *B60R 21/0134* (2006.01)
  *B60R 21/01* (2006.01)

(56) References Cited

U.S. PATENT DOCUMENTS

2016/0092516 A1   3/2016   Poola et al.
2018/0246529 A1*  8/2018   Hu ..................... G05D 1/0202

OTHER PUBLICATIONS

Kuo et al., Detecting Outliers in Data with Correlated Measures, Aug. 26, 2018.
Mao et al., Surface Fitting for Quasi Scattered Data from Coordinate Measuring Systems, Jan. 13, 2018.
Yang et al., A New Fitting Scattered Data Method based on the Criterion of Geometric Distance, 2013 2nd AASRI Conference on Computational Intelligence and Bioinformatics, Dec. 2014.
Kose et al., Robust detection and verification of linear relationships to generate metabolic networks using estimates of technical errors, May 21, 2007.
Singh, Estimate Correlation Coefficient in Azure Machine Learning Studio, Oct. 16, 2020, https://www.pluralsight.com/guides/estimate-correlation-coefficient-in-azure-machine-learning-studio.
NCSS Statistical Software, Robust Regression, 2021.
Zimmermann et al., Optimizing Savitzky-Golay Parameters for Improving Spectral Resolution and Quantification in Infrared Spectroscopy, Aug. 1, 2013.

* cited by examiner

VEHICLE MASS MEASUREMENT FOR AUTOMATED BRAKING

BACKGROUND

The present invention relates generally to a method, system, and computer program product for vehicle mass measurement. More particularly, the present invention relates to a method, system, and computer program product for vehicle mass measurement for automated braking.

A collision avoidance system or collision mitigation system is a vehicle control system designed to prevent or reduce the severity of a collision. A collision avoidance or mitigation system monitors a vehicle's speed, the speed of another vehicle, and the distance between the vehicles. If the distance between the vehicles is predicted to decrease below a threshold amount, some systems warn a human driver of an impending collision, some systems brake the vehicle (or perform another action) to attempt to avoid the impending collision, and some systems provide both a warning and an autonomous action. An autonomous vehicle (AV) has no human driver to warn, but also includes a braking system with a collision avoidance component.

A trailer brake controller is an electronic device that regulates brakes on a trailer, allowing a driver of a vehicle towing the trailer to activate, monitor, and adjust trailer brake activity from the driving position of the towing vehicle. When the towing vehicle's braking system is activated (e.g. by the driver pressing the brake pedal, or by an automated system), the trailer brake controller signals brakes on the trailer wheels to activate, helping stop the tow vehicle-trailer combination. Typically, a driver adjusts the maximum amount of power a trailer brake controller applies to the trailer brakes and how aggressively the brake controller applies the brakes manually, by testing the braking action of the tow vehicle-trailer combination and adjusting until the driver perceives the braking action to be correct for a particular trailer and load.

SUMMARY

The illustrative embodiments provide a method, system, and computer program product. An embodiment includes a method that constructs, from a set of point data, a set of scattered rays, a ray in the set of scattered rays comprising a line with a first endpoint at an origin point and a second endpoint at a point in the set of point data, wherein the point comprises an x coordinate denoting an acceleration value and a y coordinate denoting a force value of a vehicle. An embodiment computes, from the set of scattered rays, a set of ray slopes, a ray slope in the set of ray slopes comprising a slope of the ray. An embodiment maps the set of ray slopes to a corresponding set of trigonometric functions. An embodiment selects, using an optimization method, a parameter of the set of trigonometric functions. An embodiment computes, using an inverse of the set trigonometric functions, a vehicle mass corresponding to the set of point data. An embodiment adjusts, based on the vehicle mass, a threshold braking distance of a collision avoidance system of the vehicle, the threshold braking distance comprising a distance from an object predicted to collide with the vehicle. An embodiment avoids, by braking the vehicle at least the threshold braking distance from the object, a predicted collision between the vehicle and the object.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
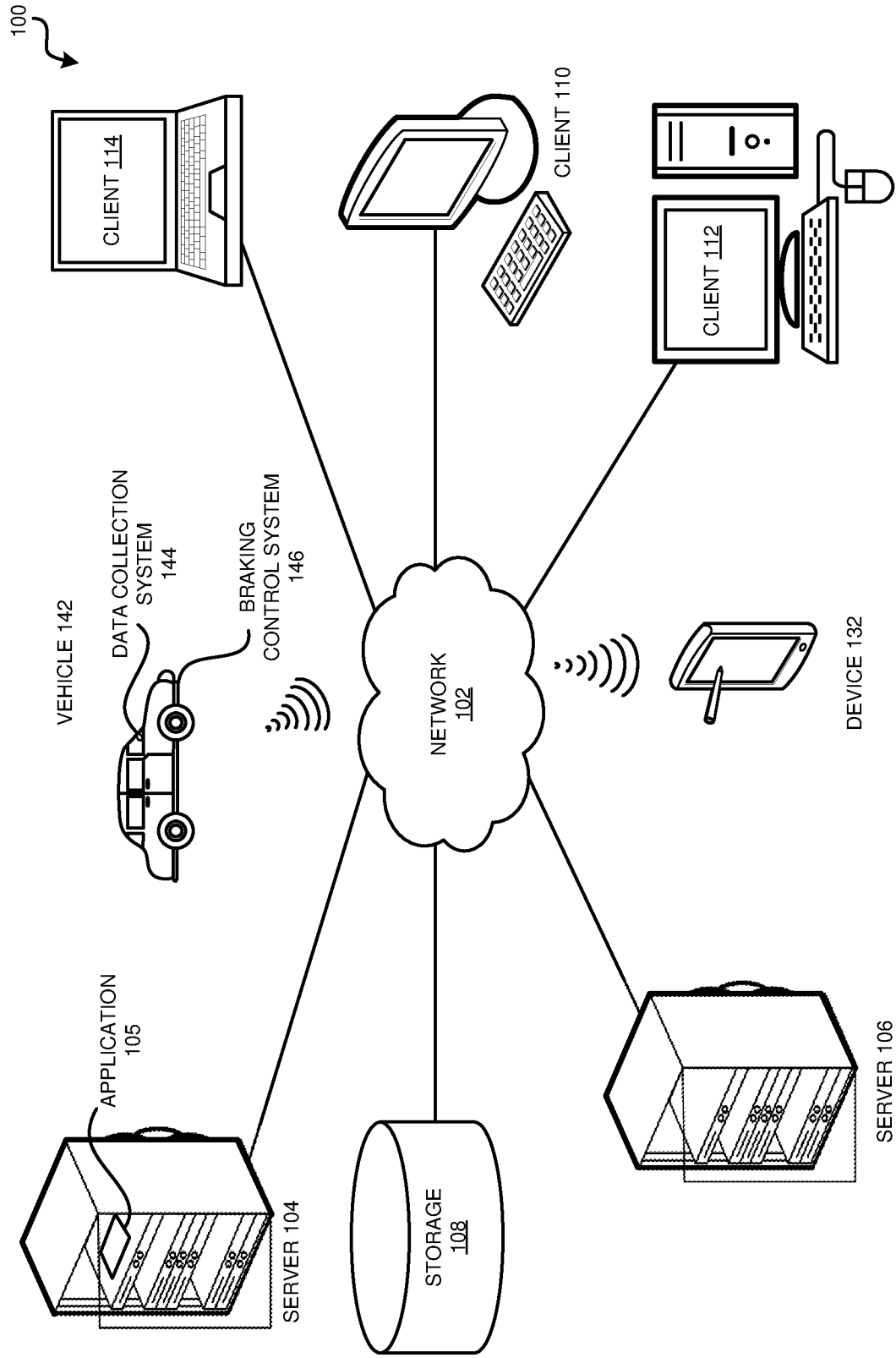
FIG. 1 depicts a block diagram of a network of data processing systems in which illustrative embodiments may be implemented.

The illustrative embodiments recognize that mass is a component in computing a vehicle's momentum (i.e. how long, in time and distance, before a predicted collision to brake), the braking force necessary to decelerate a vehicle within a particular distance, and kinetic energy (i.e. how severe a collision is likely to be, and whether a collision is avoidable at all). In particular, using the same brake force a heavier vehicle or vehicle-trailer combination requires a greater stopping distance than a lighter vehicle. Alternatively, a heavier vehicle requires more brake force to stop within a particular distance than a lighter vehicle. The kinetic energy of a vehicle is also usable in determining whether to brake at all (e.g. because overbraking would cause a vehicle to skid or jackknife), as well as whether to perform additional mitigation actions, such as deploying air bags to protect a vehicle's passengers. As a result, knowledge of a vehicle's current mass is important in appropriately configuring a vehicle's automated braking system, collision avoidance system, or trailer brake controller. For similar reasons, knowledge of a vehicle's current mass is important in performing range calculations for an electric vehicle, and in other AV control applications. Knowledge of a vehicle's current mass is also important in computing other vehicle performance parameters, for example the aerodynamic characteristics and hence fuel consumption rate of an aircraft and the performance characteristics and hence fuel consumption or optimal sail configuration of a boat.

The illustrative embodiments also recognize that a vehicle's mass is not constant. The number of occupants, and their sizes, can change from one journey to another. For example, adults generally mass more than small children. A vehicle's cargo area might be empty or full, or in an intermediate state, and the mass of any cargo is variable as well. A vehicle might be pulling a trailer one day and not another day, the trailer itself might be empty or full, and the mass of the trailer's cargo comparatively heavy or light. In addition, the mass of a vehicle with a fuel tank changes during a journey as fuel is burned and the tank refilled. Hence, the illustrative embodiments recognize that there is a need to determine a vehicle's current mass.

The illustrative embodiments also recognize that determining a vehicle's mass, using the expression F=m*a (force=mass multiplied by acceleration), is one example of a linear relationship between variables. Some other non-limiting examples of linear relationships known in physics are v=n*t (velocity=revolutions multiplied by transmission ratio), V=I*R (voltage =current multiplied by resistance), P=T*ω (power=torque multiplied by angular velocity). In general, any linear relationship can be represented on a graph with a line described using the expression y=m*x+b, where x and y are coordinates of a point on the line, m is the slope of the line, and b is a constant. One method of determining the slope, or m, or coefficient, term in a linear relationship uses a linear regression technique, in which a predictive model is fitted to an observed data set of x and y values. However, in vehicle and other industrial applications, observed data is often concentrated in a particular region of possible data, due to a limited range of system parameters and configurations. This data concentration often results in a model that is overfit to the data-rich region and underfit, and hence likely inaccurate, with respect to other regions in which data is sparse. Vehicle and other industrial applications are also subject to noise in observed data. Consequently, the illustrative embodiments recognize that there is an unmet need for more accurate modelling of a linear relationship, and in particular to determine a vehicle's current mass, for use in computing braking and other vehicle performance parameters.

The illustrative embodiments recognize that the presently available tools or solutions do not address these needs or provide adequate solutions for these needs. The illustrative embodiments used to describe the invention generally address and solve the above-described problems and other problems related to vehicle mass measurement for automated braking.

An embodiment can be implemented as a software application. The application implementing an embodiment can be configured as a modification of an existing vehicle control system, as a separate application that operates in conjunction with an existing vehicle control system, a standalone application, or some combination thereof.

Particularly, some illustrative embodiments provide a method that constructs, from a set of point data, a set of scattered rays, computes a set of ray slopes from the set of scattered rays, maps the set of ray slopes to a corresponding set of trigonometric functions, uses an optimization method to select a parameter of the set of trigonometric functions, uses an inverse of the set trigonometric functions to compute a vehicle mass corresponding to the set of point data, and used the computed vehicle mass to avoid a predicted collision by braking the vehicle.

An embodiment receives data from which to derive a linear relationship. In particular, the data comprises pairs of values, in which one element of each pair corresponds to an x coordinate and the other element of each pair corresponds to a y coordinate. Thus, each pair of values comprises a point in a two-dimensional graph, and the embodiment's goal is to find a line connecting the points, with a slope corresponding to a variable being modelled. One embodiment receives acceleration and corresponding force data from which a mass of the vehicle is to be computed.

An embodiment filters the point data to remove one or more outliers. An outlier is a data point that is more than a threshold distance from any other data point, or more than a threshold distance from a predetermined number of other data points. Outlier filtering techniques are presently known.

An embodiment selects an origin point within the filtered point data, and construct a set of scattered rays by connecting each data point to the selected origin point. One embodiment selects, as the origin point, a point with an x coordinate equal to zero and a y coordinate equal to zero. Because the rays are lines in a two-dimensional graph, each ray has a slope corresponding to a variable being modelled.

An embodiment filters the set of ray slopes to remove one or more outliers. One embodiment constructs a histogram of the number of occurrences of different values of ray slopes, filters the histogram by quantile to remove outliers in the set of ray slopes. Quantiles are values that partition a finite set of values into subsets, and filtering by quantiles is a presently known technique that removes one or more of the subsets of data. Other filtering techniques are also known and contemplated within the scope of the illustrative embodiments.

An embodiment smooths the filtered set of ray slopes to reduce the influence of high-density outliers on eventual model results. One embodiment uses a Savitzky-Golay, or Savgol, filter, a presently known digital filter that smooths a set of data points. Other smoothing techniques are also known and contemplated within the scope of the illustrative embodiments.

To reduce the effects of noise generated during data collection and resulting model inconsistency, an embodiment maps the filtered and smoothed set of ray slopes to a corresponding set of trigonometric functions. In particular, if each ray slope is denoted by m, an embodiment computes the arctangent of m divided by a predefined parameter. In one embodiment, the predefined parameter is selected based on parameters of a particular vehicle or vehicle model. Selecting a predefined parameter that is an estimate of the measurement being performed reduces the number of optimizations needed to optimize the predefined parameter An embodiment uses an optimization method to optimize the predefined parameter to produce as significant a function peak as possible. One embodiment uses a Bayesian optimization to optimize the predefined parameter. Bayesian optimization is a presently known sequential strategy for function optimization that does not assume that the function has a particular form. Other optimization techniques are also known and contemplated within the scope of the illustrative embodiments.

An embodiment maps the optimized trigonometric function back to its original domain. In particular, if the trigonometric function computed the arctangent of m divided by a predefined parameter, an embodiment computes m=p multiplied by the tangent of the peak value, where m denotes a slope value within a linear relationship and p denotes the optimized parameter.

An embodiment evaluates the model quality. One embodiment evaluates model quality by repeating the data collection and processing one or more times, optionally under different working conditions, obtaining multiple slope values. When further repeats of the data collection and processing fail to alter an area under the peak in a graph of the optimized trigonometric function by more than a threshold amount, an embodiment computes m=p multiplied by the tangent of the peak value in that graph.

An embodiment implemented in a vehicle uses the model to compute the vehicle's current mass from current acceleration and corresponding force data, and uses the computed mass to configure the vehicle's automated braking system, collision avoidance system, or trailer brake controller. In particular, one embodiment adjusts, based on the vehicle mass, a threshold braking distance of a collision avoidance system of the vehicle. The threshold braking distance is a distance from an object predicted to collide with the vehicle by which the vehicle should brake to avoid a predicted collision. The embodiment avoids the predicted collision by braking the vehicle at least the threshold braking distance from the object with which the vehicle is predicted to collide. Another embodiment adjusts, based on the vehicle mass, an airbag trigger threshold of the vehicle. The airbag trigger threshold is a kinetic energy value of a predicted collision between the vehicle and an object. If a kinetic energy of a predicted collision is above the airbag trigger threshold, the embodiment triggers the vehicle's airbag system. Another embodiment implemented in a vehicle uses the computed mass in performing range calculations for an electric vehicle, and in other AV control applications. Another embodiment implemented in a vehicle uses the computed mass in computing other vehicle performance parameters, for example the aerodynamic characteristics and hence fuel consumption rate of an aircraft and the performance characteristics and hence fuel consumption or optimal sail configuration of a boat.

The manner of vehicle mass measurement for automated braking described herein is unavailable in the presently available methods in the technological field of endeavor pertaining to vehicle control systems. A method of an embodiment described herein, when implemented to execute on a device or data processing system, comprises substantial advancement of the functionality of that device or data processing system in constructing, from a set of point data, a set of scattered rays, computing a set of ray slopes from the set of scattered rays, mapping the set of ray slopes to a corresponding set of trigonometric functions, using an optimization method to select a parameter of the set of trigonometric functions, using an inverse of the set trigonometric functions to compute a vehicle mass corresponding to the set of point data, and using the computed vehicle mass to avoid a predicted collision by braking the vehicle.

The illustrative embodiments are described with respect to certain types of linear relationships, point data, transformations, mappings, trigonometric functions, filtering, smoothing, vehicle systems, thresholds, evaluations, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
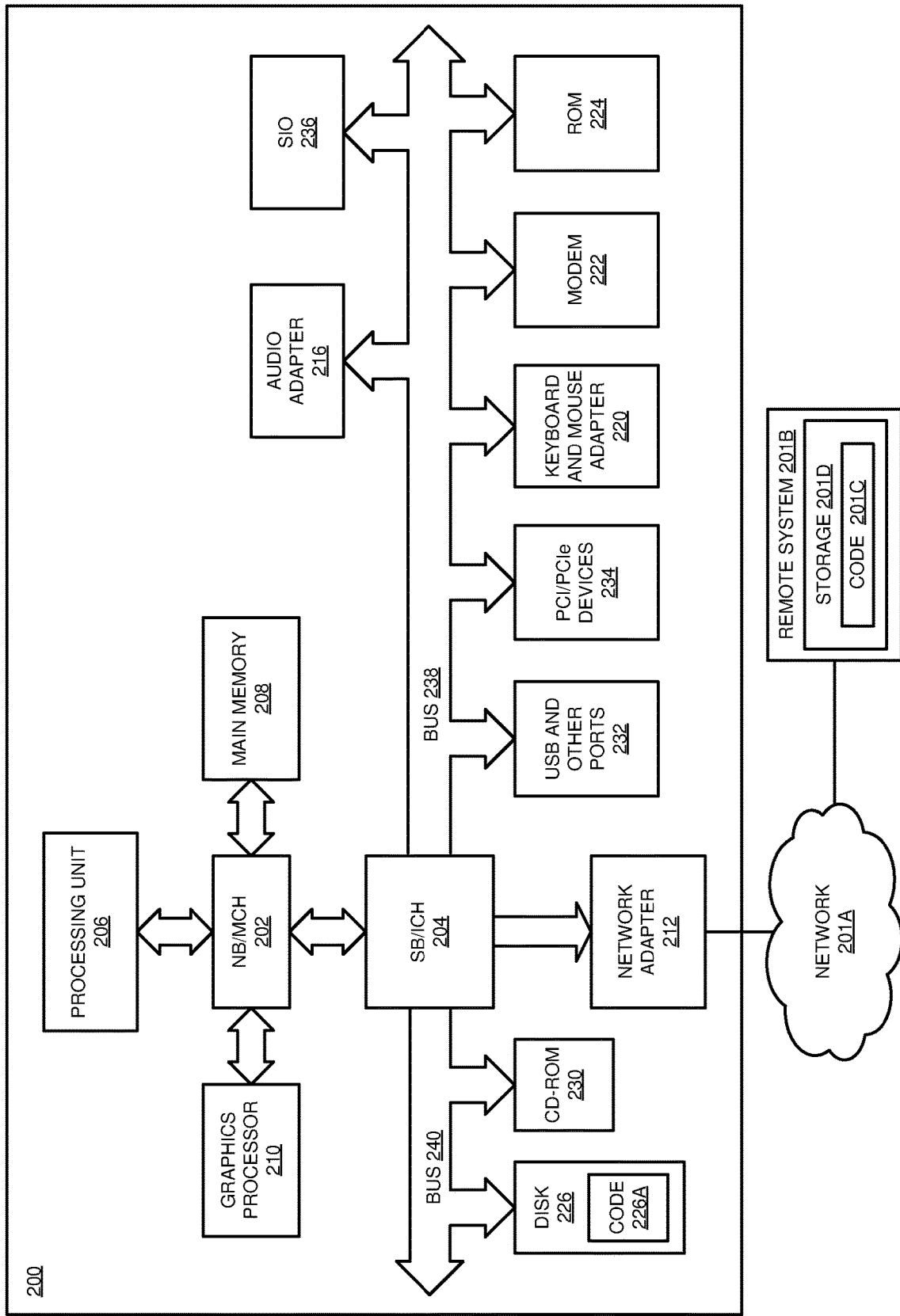
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Device 132 can be implemented within a vehicle.

Vehicle 142 is an example of a device described herein. For example, vehicle 142 can take the form of a smartphone, a tablet computer, a laptop computer, client 110 in a stationary or a portable form, or any other suitable device installed in a vehicle. Vehicle 142 includes data collection system 144 and braking control system 146, for use in configuring and controlling vehicle 142. Any software application described as executing in another data processing system in FIG. 1 can be configured to execute in vehicle 142 in a similar manner. Any data or information stored or produced in another data processing system in FIG. 1 can be configured to be stored or produced in vehicle 142 in a similar manner.

Application 105 implements an embodiment described herein. Application 105 executes in any of servers 104 and 106, clients 110, 112, and 114, device 132, and vehicle 142.

Servers 104 and 106, storage unit 108, and clients 110, 112, and 114, device 132 and vehicle 142 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
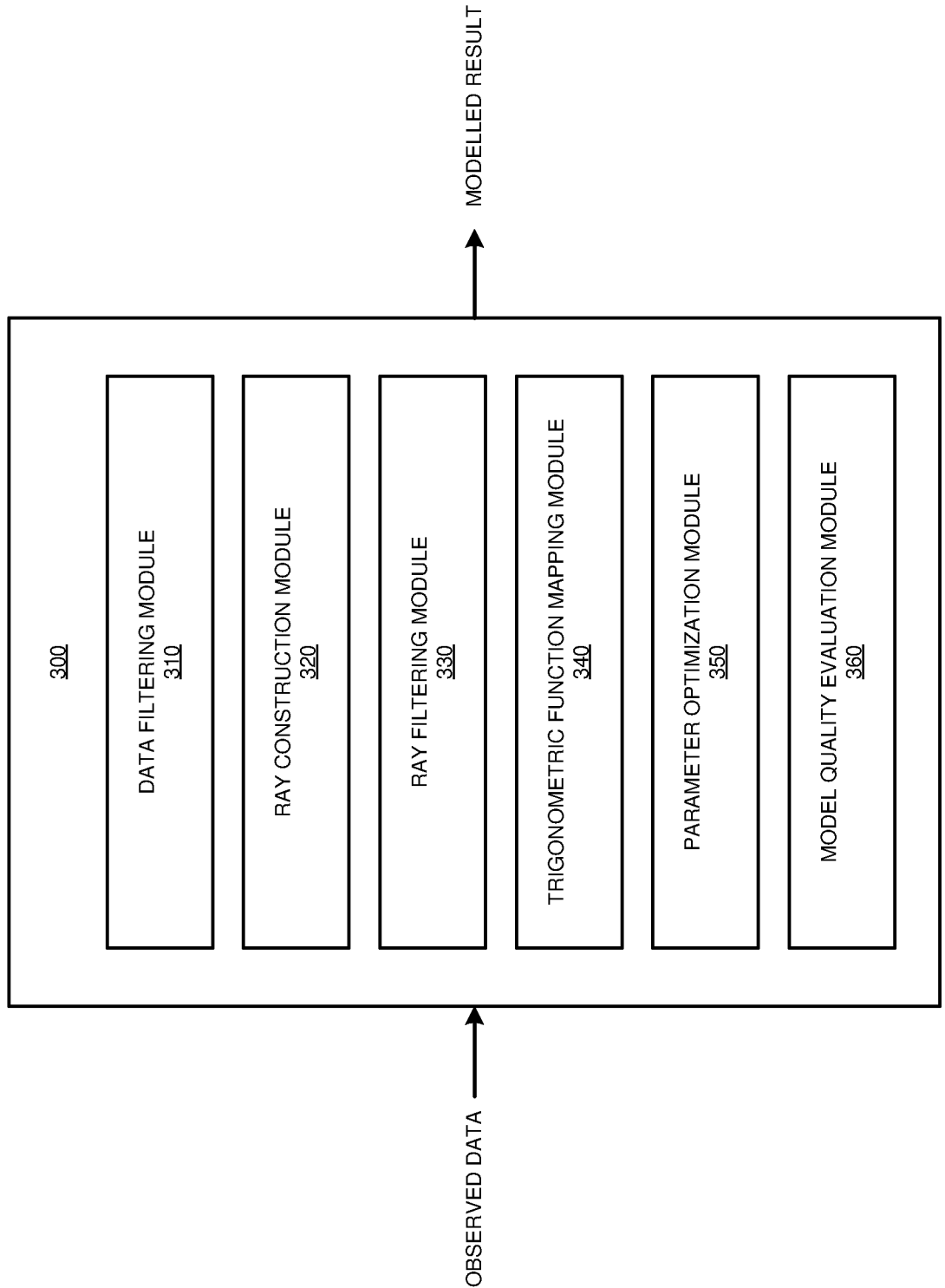
FIG. 3 depicts a block diagram of an example configuration for vehicle mass measurement for automated braking in accordance with an illustrative embodiment.

With reference to FIG. 3, this figure depicts a block diagram of an example configuration for vehicle mass measurement for automated braking in accordance with an illustrative embodiment. Application 300 is an example of application 105 in FIG. 1 and executes in any of servers 104 and 106, clients 110, 112, and 114, device 132, and vehicle 142 in FIG. 1.

Application 300 receives data from which to derive a linear relationship. In particular, the data comprises pairs of values, in which one element of each pair corresponds to an x coordinate and the other element of each pair corresponds to a y coordinate. Thus, each pair of values comprises a point in a two-dimensional graph, and application 300 will find a line connecting the points, with a slope corresponding to a variable being modelled. One implementation of application 300 receives acceleration and corresponding force data from which a mass of the vehicle (e.g. vehicle 142 in FIG. 1) is to be computed.

Data filtering module 310 filters the point data to remove one or more outliers.

Ray construction module 320 selects an origin point within the filtered point data, and construct a set of scattered rays by connecting each data point to the selected origin point. The origin point is a point with an x coordinate equal to zero and a y coordinate equal to zero. Each ray has a slope corresponding to a variable being modelled.

Ray filtering module 330 filters the set of ray slopes to remove one or more outliers. One implementation of module 330 constructs a histogram of the number of occurrences of different values of ray slopes, filters the histogram by quantile to remove outliers in the set of ray slopes, and smooths the filtered histogram, reducing the influence of high-density outliers on eventual model results. One implementation uses a Savitzky-Golay, or Savgol, filter, to perform the smoothing.

Trigonometric function mapping module 340 maps the filtered and smoothed set of ray slopes to a corresponding set of trigonometric functions. In particular, if each ray slope is denoted by m, module 340 computes the arctangent of m divided by a predefined parameter.

Parameter optimization module 350 uses an optimization method to optimize the predefined parameter to produce as significant a function peak as possible. One implementation of module 350 uses a Bayesian optimization to optimize the predefined parameter. Module 350 maps the optimized trigonometric function back to its original domain. In particular, if the trigonometric function computed the arctangent of m divided by a predefined parameter, module 350 computes m=p multiplied by the tangent of the peak value, where m denotes a slope value within a linear relationship and p denotes the optimized parameter.

Model quality optimization module 360 evaluates the model quality. One implementation of module 360 evaluates model quality by repeating the data collection and processing one or more times, optionally under different working conditions, obtaining multiple slope values. When further repeats of the data collection and processing fail to alter an area under the peak in a graph of the optimized trigonometric function by more than a threshold amount, module 350 computes m=p multiplied by the tangent of the peak value in that graph.

Application 300, implemented in a vehicle, uses the model to compute the vehicle's current mass from current acceleration and corresponding force data, and uses the computed mass to configure the vehicle's automated braking system, collision avoidance system, or trailer brake controller. Another implementation of application 300 implemented in a vehicle uses the computed mass in performing range calculations for an electric vehicle, and in other AV control applications. Another implementation of application 300 implemented in a vehicle uses the computed mass in computing other vehicle performance parameters, for example the aerodynamic characteristics and hence fuel consumption rate of an aircraft and the performance characteristics and hence fuel consumption or optimal sail configuration of a boat.

Figure 4:
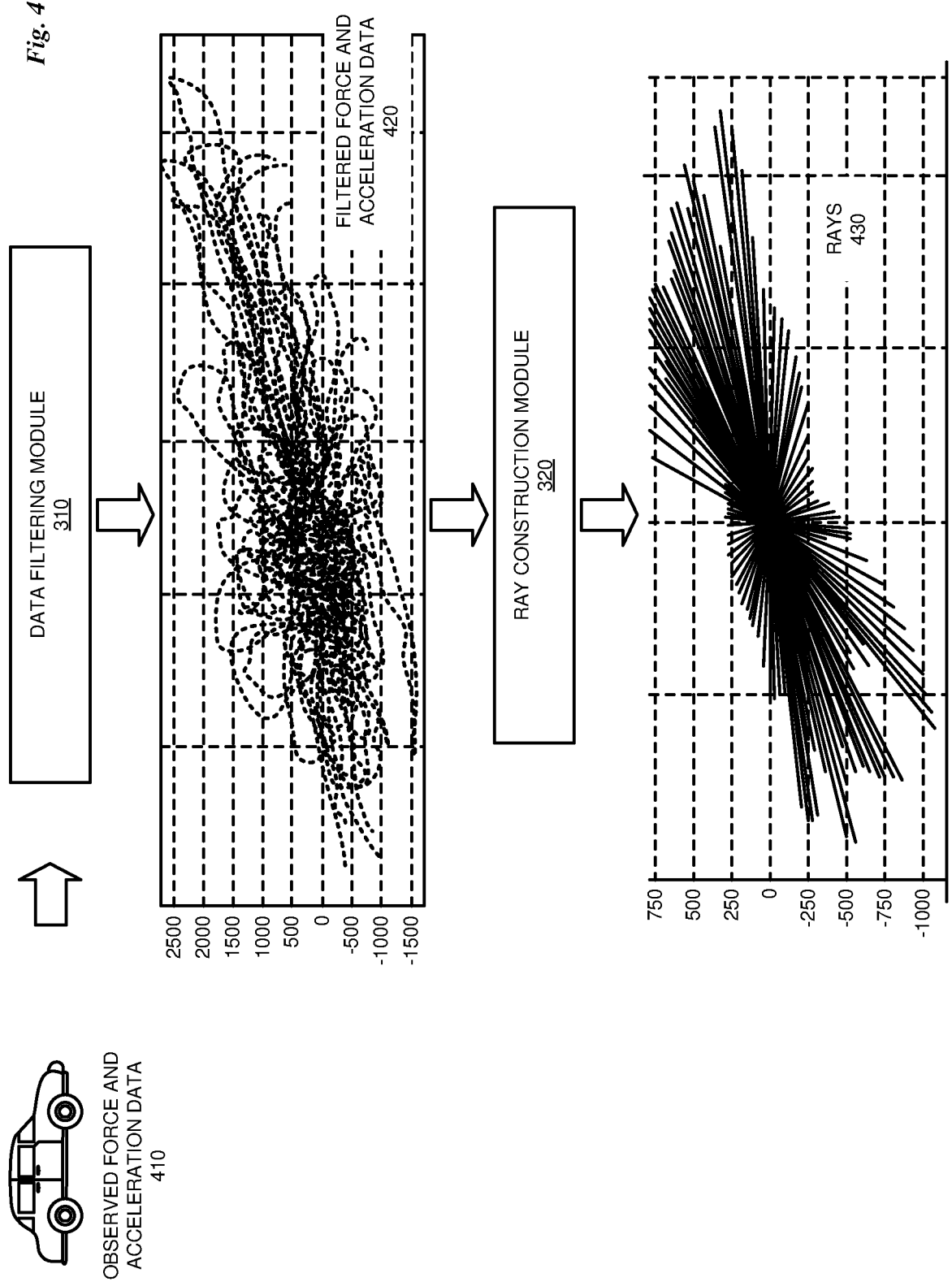
FIG. 4 depicts an example of vehicle mass measurement for automated braking in accordance with an illustrative embodiment.

With reference to FIG. 4, this figure depicts an example of vehicle mass measurement for automated braking in accordance with an illustrative embodiment. The example can be executed using application 300 in FIG. 3. Data filtering module 310 and ray construction module 320 are the same as data filtering module 310 and ray construction module 320 in FIG. 3. Note that the depicted graphs are schematic depictions of generic data, and are not intended to depict a real set of data or be numerically accurate.

As depicted, data filtering module 310 receives observed force and acceleration data 410 and filters data 410 to remove one or more outliers. The result is depicted as filtered force and acceleration data 420. Ray construction module 320 selects an origin point within data 420, and construct a set of scattered rays by connecting each data point to the selected origin point. The result is depicted as rays 430.

Figure 5:
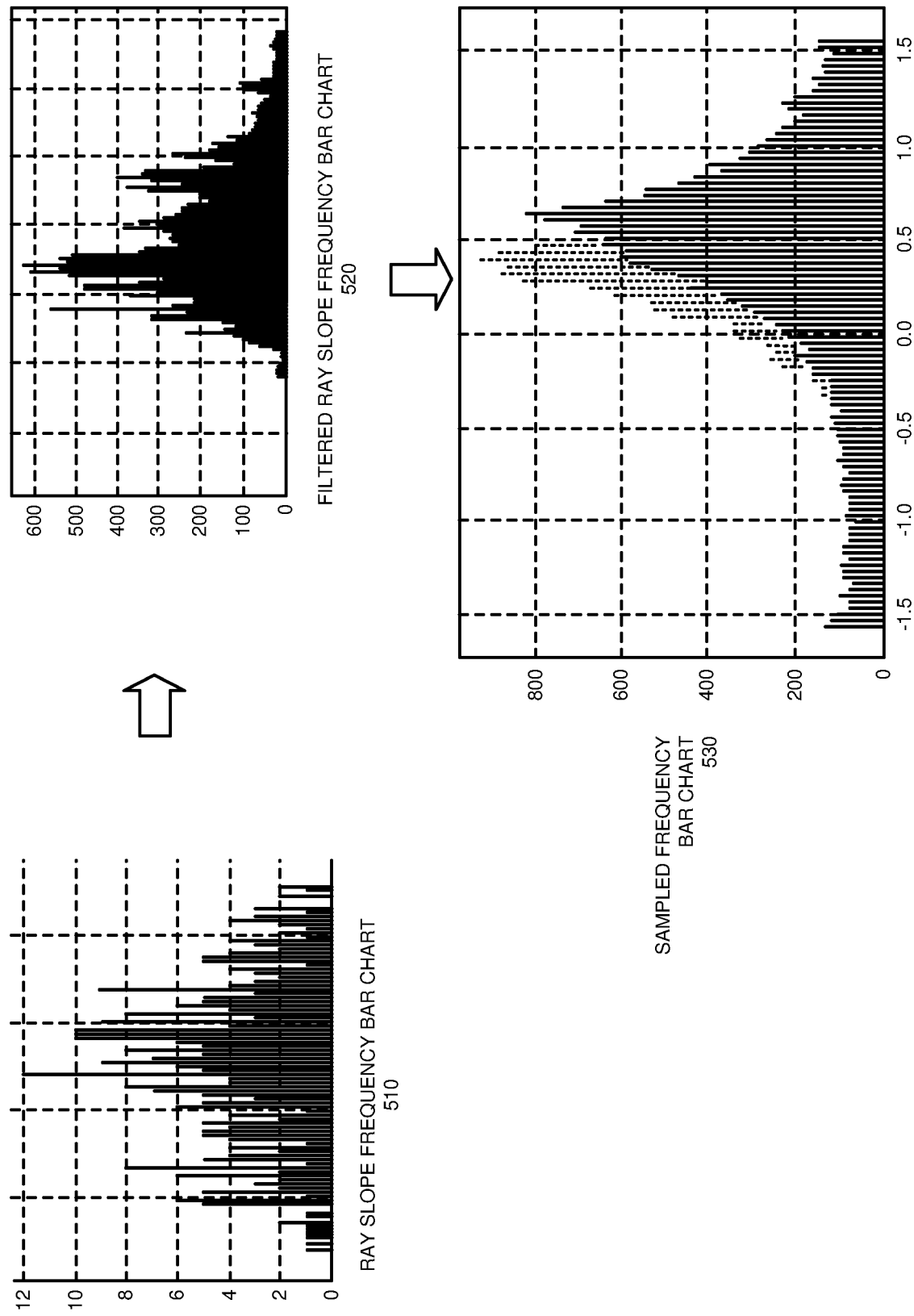
FIG. 5 depicts a continued example of vehicle mass measurement for automated braking in accordance with an illustrative embodiment.

With reference to FIG. 5, this figure depicts a continued example of vehicle mass measurement for automated braking in accordance with an illustrative embodiment. Note that the depicted graphs are schematic depictions of generic data, and are not intended to depict a real set of data or be numerically accurate.

Ray slope frequency bar chart 510 depicts a bar chart of the ray slopes in rays 430 in FIG. 4. Ray filtering module 330 filters the set of ray slopes to remove one or more outliers, resulting in filtered ray slope frequency bar chart 520. Module 330 also smooths the filtered set of ray slopes to reduce the influence of high-density outliers on eventual model results, resulting in sampled frequency bar chart 530.

Figure 6:
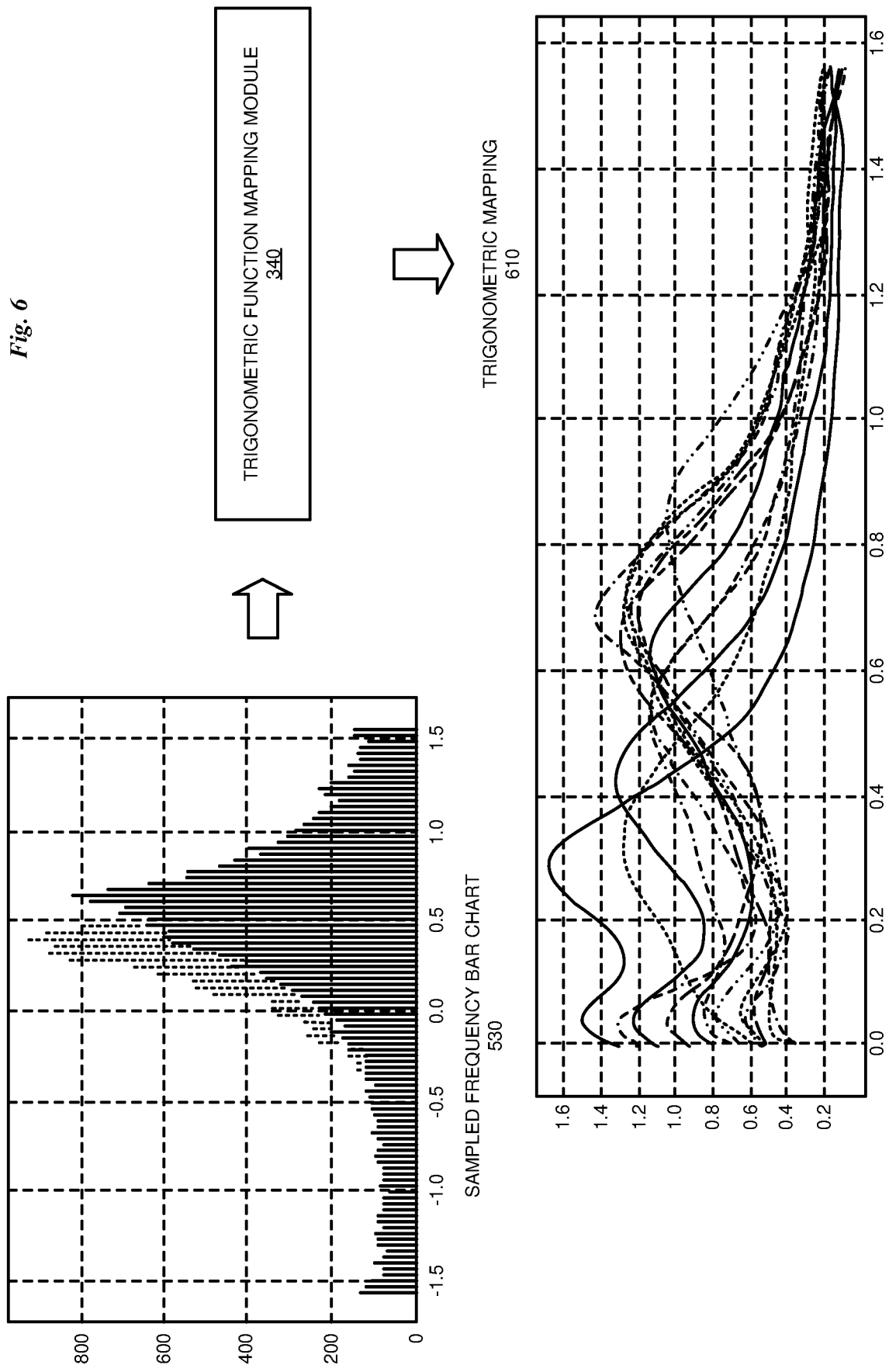
FIG. 6 depicts a continued example of vehicle mass measurement for automated braking in accordance with an illustrative embodiment.

With reference to FIG. 6, this figure depicts a continued example of vehicle mass measurement for automated braking in accordance with an illustrative embodiment. Trigonometric function mapping module 340 is the same as trigonometric function mapping module 340 in FIG. 3. Sampled frequency bar chart 530 is the same as sampled frequency bar chart 530 in FIG. 5. Note that the depicted graphs are schematic depictions of generic data, and are not intended to depict a real set of data or be numerically accurate.

As depicted, trigonometric function mapping module 340 maps the filtered and smoothed set of ray slopes, depicted in sampled frequency bar chart 530, to a corresponding set of trigonometric functions, depicted in trigonometric mapping 610.

Figure 7:
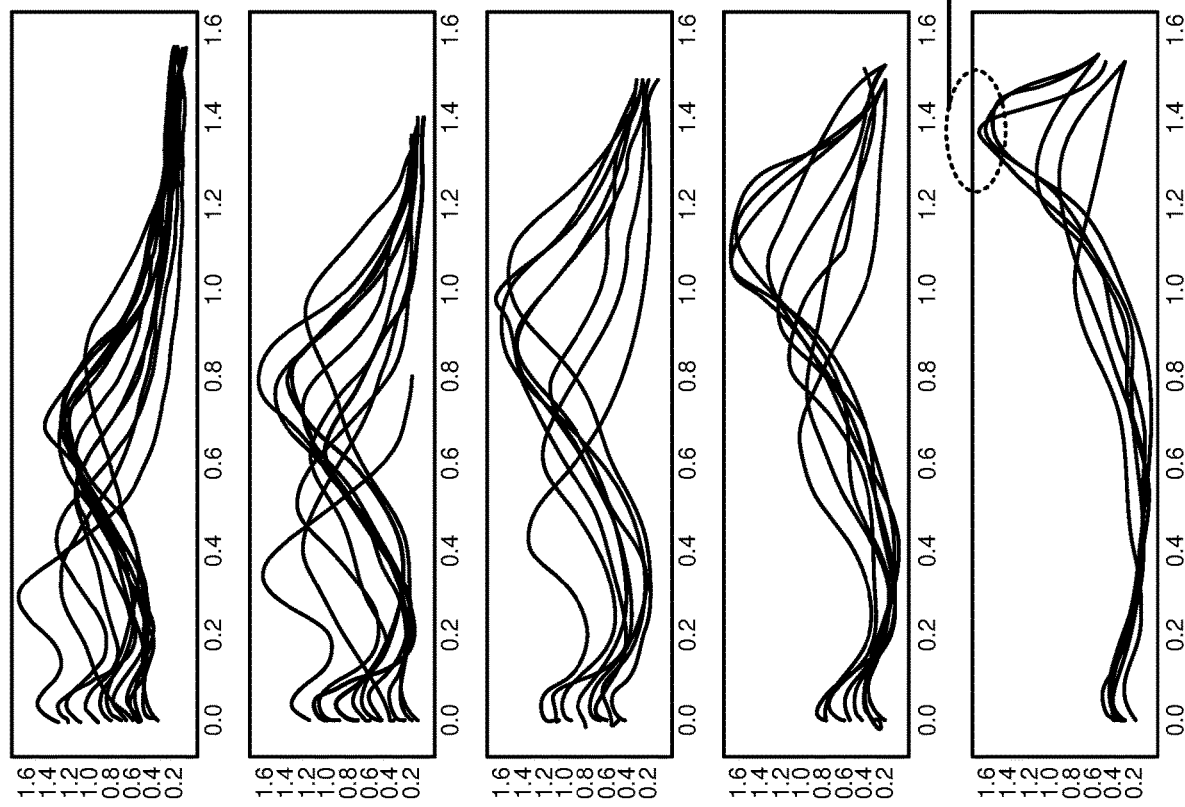
FIG. 7 depicts a continued example of vehicle mass measurement for automated braking in accordance with an illustrative embodiment.

With reference to FIG. 7, this figure depicts a continued example of vehicle mass measurement for automated braking in accordance with an illustrative embodiment. Note that the depicted graphs are schematic depictions of generic data, and are not intended to depict a real set of data or be numerically accurate.

Optimization 710 depicts steps in the optimization of trigonometric mapping 610 in FIG. 6. In particular, if the trigonometric function computed the arctangent of m divided by a predefined parameter, after optimization parameter optimization module 350 computes m=p multiplied by the tangent of the peak value, where m denotes a slope value within linear relationship 720 and p denotes the optimized parameter.

Figure 8:
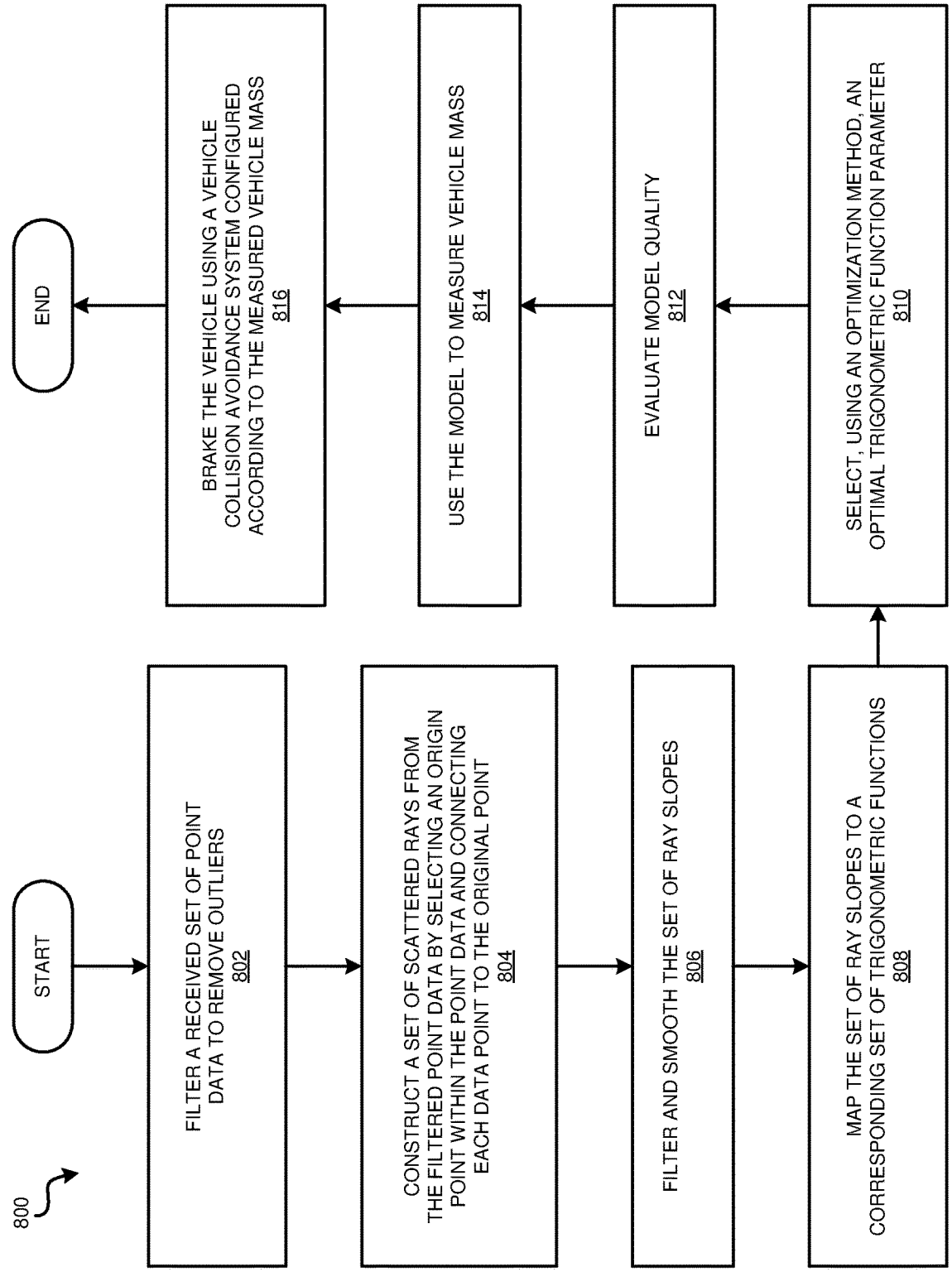
FIG. 8 depicts a flowchart of an example process for vehicle mass measurement for automated braking in accordance with an illustrative embodiment.

With reference to FIG. 8, this figure depicts a flowchart of an example process for vehicle mass measurement for automated braking in accordance with an illustrative embodiment. Process 800 can be implemented in application 300 in FIG. 3.

In block 802, the application filters a received set of point data to remove outliers. In block 804, the application constructs a set of scattered rays from the filtered point data by selecting an origin point within the point data and connecting each data point to the origin point. In block 806, the application filters and smooths the set of ray slopes. In block 808, the application maps the set of ray slopes to a corresponding set of trigonometric functions. In block 810, the application selects, using an optimization method, an optimal trigonometric function parameter. In block 812, the application evaluates model quality. In block 814, the application uses the model to measure vehicle mass. In block 816, the application brakes the vehicle using a vehicle collision avoidance system configured according to the measured vehicle mass. Then the application ends.

Figure 9:
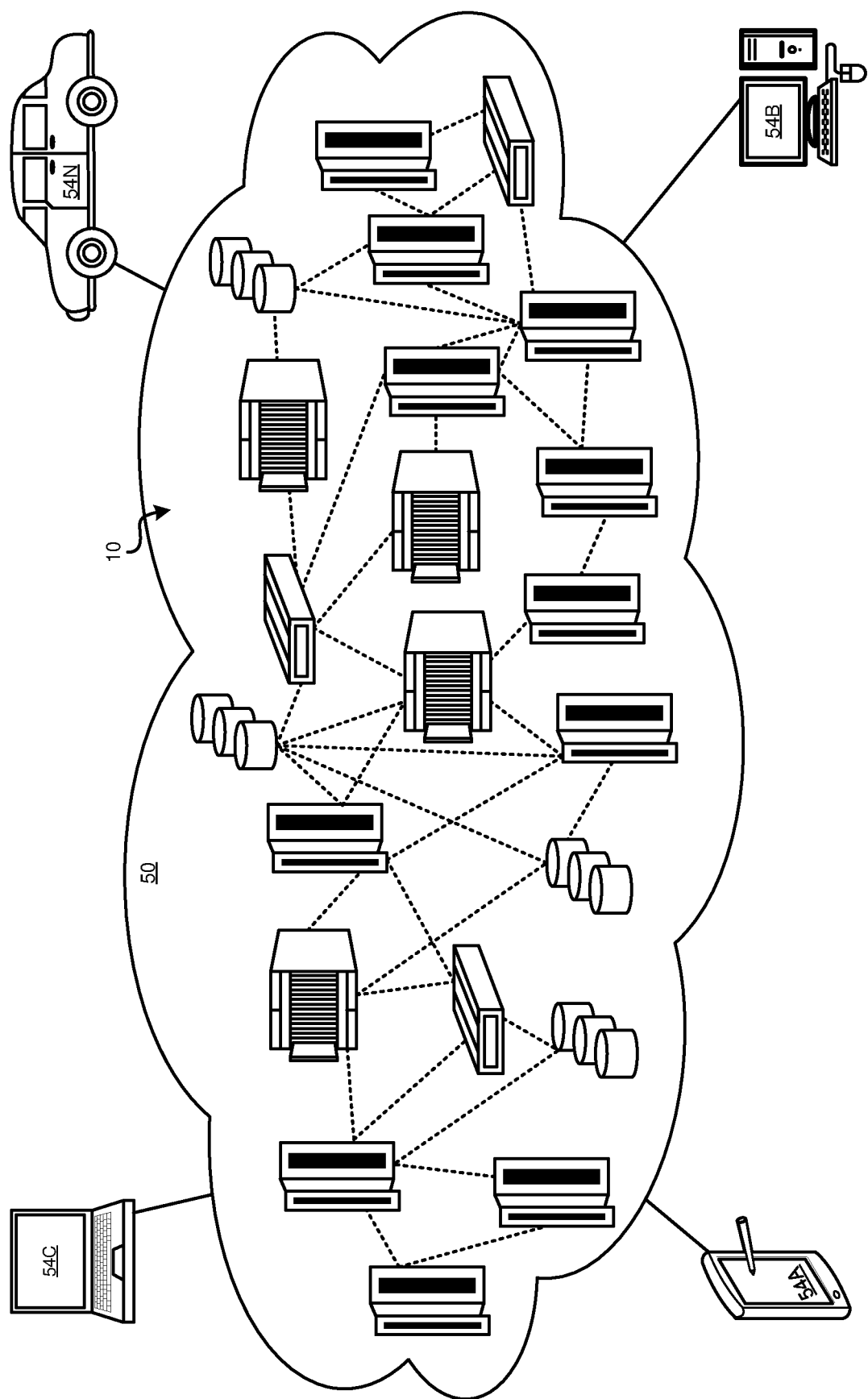
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 10:
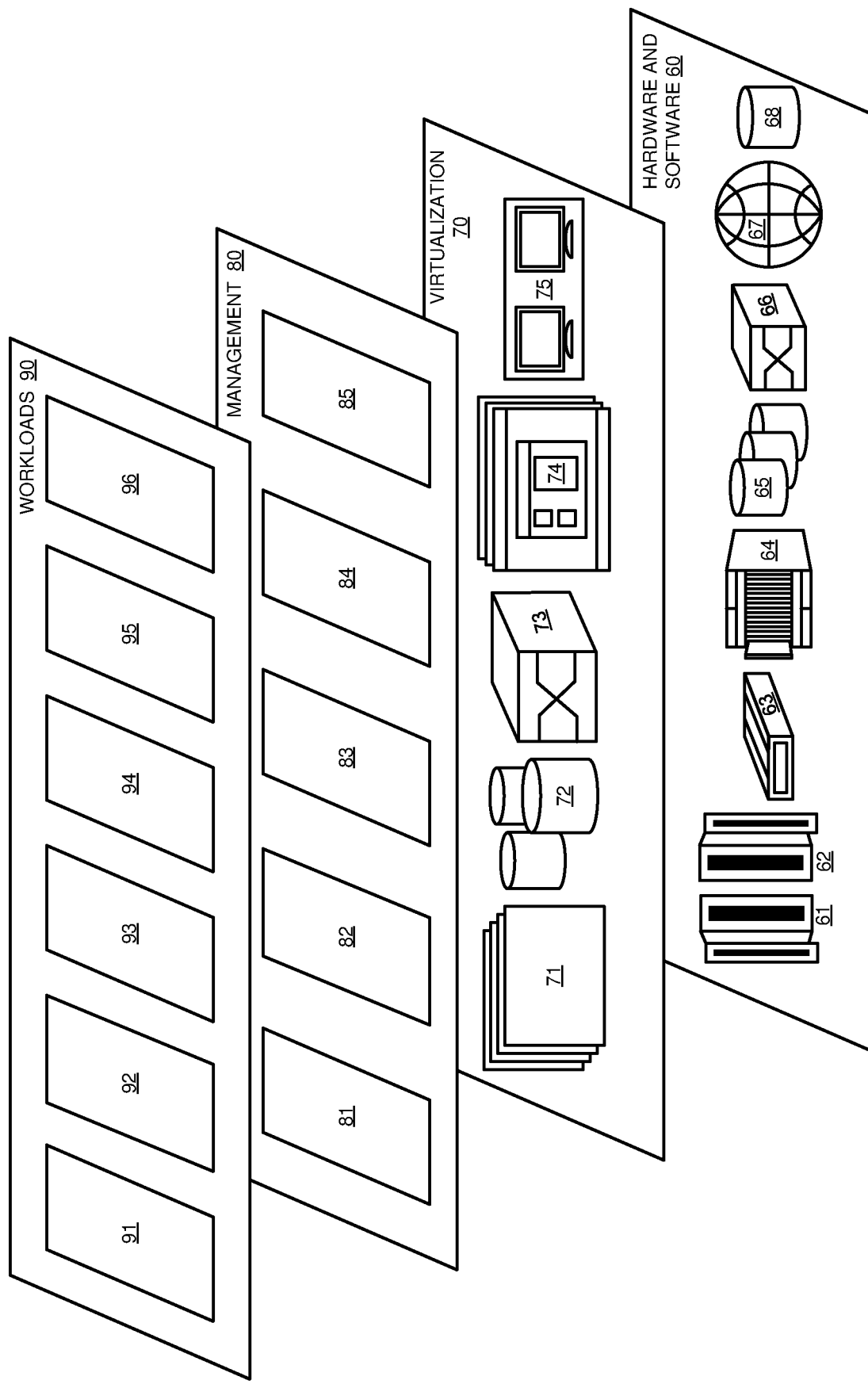
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for vehicle mass measurement for automated braking and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    constructing, from a set of point data, a set of scattered rays, a ray in the set of scattered rays comprising a line with a first endpoint at an origin point and a second endpoint at a point in the set of point data, wherein the point comprises an x coordinate denoting an acceleration value and a y coordinate denoting a force value of a vehicle;
    computing, from the set of scattered rays, a set of ray slopes, a ray slope in the set of ray slopes comprising a slope of the ray;
    mapping the set of ray slopes to a corresponding set of trigonometric functions;
    selecting, using an optimization method, a parameter of the set of trigonometric functions;
    computing, using an inverse of the set trigonometric functions, a vehicle mass corresponding to the set of point data;
    adjusting, based on the vehicle mass, a threshold braking distance of a collision avoidance system of the vehicle, the threshold braking distance comprising a distance from an object predicted to collide with the vehicle; and
    avoiding, by braking the vehicle at least the threshold braking distance from the object, a predicted collision between the vehicle and the object.

2. The computer-implemented method of claim 1, further comprising:
    filtering, prior to constructing the set of scattered rays, the set of point data, the filtering comprising removing a point from the set of point data that is more than a threshold distance from any other point in the set of point data.

3. The computer-implemented method of claim 1, wherein the origin point comprises a point with an x coordinate equal to zero and a y coordinate equal to zero.

4. The computer-implemented method of claim 1, further comprising:
    filtering, prior to the mapping, the set of ray slopes, the filtering comprising dividing the set of ray slopes into a set of quantiles and removing a subset of the set of ray slopes within a quantile in the set of quantiles.

5. The computer-implemented method of claim 1, further comprising:
    smoothing, prior to the mapping, the set of ray slopes, the smoothing comprising filtering the set of ray slopes using a Savitzky-Golay filter.

6. The computer-implemented method of claim 1, wherein the mapping comprises computing the ray slope divided by the parameter and computing an arctangent of a result of the division, the parameter comprising a predetermined constant.

7. The computer-implemented method of claim 1, further comprising:
    adjusting, based on the vehicle mass, an airbag trigger threshold of the vehicle, the airbag trigger threshold comprising a kinetic energy value of a second predicted collision between the vehicle and a second object; and
    triggering, responsive to predicting that a kinetic energy of the second predicted collision is above the adjusted airbag trigger threshold, an airbag system of the vehicle.

8. A computer program product for automated braking, the computer program product comprising:
    one or more computer readable storage media, and program instructions collectively stored on the one or more computer readable storage media, the stored program instructions comprising:
        program instructions to construct, from a set of point data, a set of scattered rays, a ray in the set of scattered rays comprising a line with a first endpoint at an origin point and a second endpoint at a point in the set of point data, wherein the point comprises an x coordinate denoting an acceleration value and a y coordinate denoting a force value of a vehicle;
        program instructions to compute, from the set of scattered rays, a set of ray slopes, a ray slope in the set of ray slopes comprising a slope of the ray;
        program instructions to map the set of ray slopes to a corresponding set of trigonometric functions;
        program instructions to select, using an optimization method, a parameter of the set of trigonometric functions;
        program instructions to compute, using an inverse of the set trigonometric functions, a vehicle mass corresponding to the set of point data;
        program instructions to adjust, based on the vehicle mass, a threshold braking distance of a collision avoidance system of the vehicle, the threshold braking distance comprising a distance from an object predicted to collide with the vehicle; and
        program instructions to avoid, by braking the vehicle at least the threshold braking distance from the object, a predicted collision between the vehicle and the object.

9. The computer program product of claim 8, the stored program instructions further comprising:
program instructions to filter, prior to constructing the set of scattered rays, the set of point data, the filtering comprising removing a point from the set of point data that is more than a threshold distance from any other point in the set of point data.

10. The computer program product of claim 8, wherein the origin point comprises a point with an x coordinate equal to zero and a y coordinate equal to zero.

11. The computer program product of claim 8, the stored program instructions further comprising:
program instructions to filter, prior to the mapping, the set of ray slopes, the filtering comprising dividing the set of ray slopes into a set of quantiles and removing a subset of the set of ray slopes within a quantile in the set of quantiles.

12. The computer program product of claim 8, the stored program instructions further comprising:
program instructions to smooth, prior to the mapping, the set of ray slopes, the smoothing comprising filtering the set of ray slopes using a Savitzky-Golay filter.

13. The computer program product of claim 8, wherein the mapping comprises computing the ray slope divided by the parameter and computing an arctangent of a result of the division, the parameter comprising a predetermined constant.

14. The computer program product of claim 8, the stored program instructions further comprising:
program instructions to adjust, based on the vehicle mass, an airbag trigger threshold of the vehicle, the airbag trigger threshold comprising a kinetic energy value of a second predicted collision between the vehicle and a second object; and
program instructions to trigger, responsive to predicting that a kinetic energy of the second predicted collision is above the adjusted airbag trigger threshold, an airbag system of the vehicle.

15. The computer program product of claim 8, wherein the stored program instructions are stored in the at least one of the one or more storage media of a local data processing system, and wherein the stored program instructions are transferred over a network from a remote data processing system.

16. The computer program product of claim 8, wherein the stored program instructions are stored in the at least one of the one or more storage media of a server data processing system, and wherein the stored program instructions are downloaded over a network to a remote data processing system for use in a computer readable storage device associated with the remote data processing system.

17. The computer program product of claim 8, wherein the computer program product is provided as a service in a cloud environment.

18. A computer system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:
program instructions to construct, from a set of point data, a set of scattered rays, a ray in the set of scattered rays comprising a line with a first endpoint at an origin point and a second endpoint at a point in the set of point data, wherein the point comprises an x coordinate denoting an acceleration value and a y coordinate denoting a force value of a vehicle;
program instructions to compute, from the set of scattered rays, a set of ray slopes, a ray slope in the set of ray slopes comprising a slope of the ray;
program instructions to map the set of ray slopes to a corresponding set of trigonometric functions;
program instructions to select, using an optimization method, a parameter of the set of trigonometric functions;
program instructions to compute, using an inverse of the set trigonometric functions, a vehicle mass corresponding to the set of point data;
program instructions to adjust, based on the vehicle mass, a threshold braking distance of a collision avoidance system of the vehicle, the threshold braking distance comprising a distance from an object predicted to collide with the vehicle; and
program instructions to avoid, by braking the vehicle at least the threshold braking distance from the object, a predicted collision between the vehicle and the object.

19. The computer system of claim 18, the stored program instructions further comprising:
program instructions to filter, prior to constructing the set of scattered rays, the set of point data, the filtering comprising removing a point from the set of point data that is more than a threshold distance from any other point in the set of point data.

20. The computer system of claim 18, wherein the origin point comprises a point with an x coordinate equal to zero and a y coordinate equal to zero.

* * * * *